F. CASTIGLIONI.
SYSTEM OF ELECTRICAL DISTRIBUTION.
APPLICATION FILED AUG. 28, 1912.
1,160,842.
Patented Nov. 16, 1915.
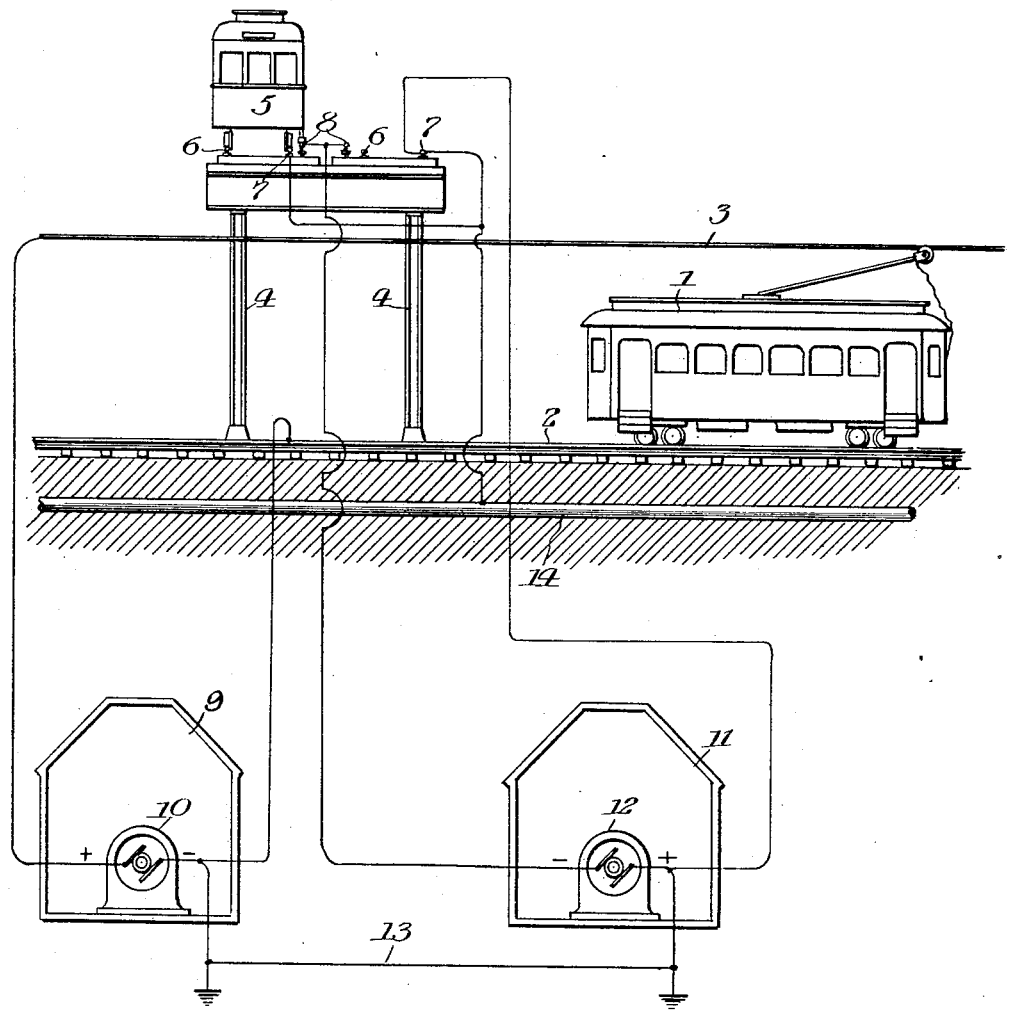

UNITED STATES PATENT OFFICE.

FERRUCCIO CASTIGLIONI, OF WILMETTE, ILLINOIS.

SYSTEM OF ELECTRICAL DISTRIBUTION.

1,160,842.      Specification of Letters Patent.      Patented Nov. 16, 1915.

Application filed August 28, 1912. Serial No. 717,459.

*To all whom it may concern:*

Be it known that I, FERRUCCIO CASTIGLIONI, a subject of the King of Italy, residing at Wilmette, in the county of Cook and State of Illinois, have invented a certain new and useful Improvement in Systems of Electrical Distribution, of which the following is a full, clear, concise, and exact description, reference being had to the accompanying drawings, forming a part of this specification.

My invention relates to systems of electrical distribution for power, traction and the like, and has for its object to prevent or reduce electrolysis in underground structures including pipes, cables and the like.

In the accompanying drawings the figure is an illustration more or less diagrammatic of an electrical distribution system embodying my present invention.

The drawing or view is illustrative of the trolley system and also of an overhead or elevated system, together with the connections and apparatus and cars therefor. For example, the trolley or surface system is illustrated by a trolley car 1, running on rails 2 and having its trolley pole in connection with the trolley wire 3. The overhead or elevated system is represented by the elevated structure 4 on which is shown a car 5 traveling on rails 6 and 7. A third rail 8 is also shown mounted on the elevated structure alongside of the other rails for the usual purpose. I have shown also the power house 9 for the trolley system, said power house containing one or more generators 10, the positive pole of which is connected with the trolley wires 3, and the negative pole of which is connected to the running rails 2, the current thus being fed to the trolley system from the positive pole of the generator or generators and returned through the rails and usual connection between the running rails 2 and the generator. I have also shown the power house 11 of the elevated system containing a generator or generators 12, the negative pole of which is connected with the third or feed rail 8 of the elevated structure, and the positive pole of which is connected to the running rails 7. Thus in the elevated system the current supply is reversed from that in the trolley system, the negative pole being connected with the supply or feed wires and the return being to the positive pole of the generator. I have also shown a connection 13 between the ground connections of the power houses 9 and 11. I have also shown a pipe 14 embedded in the ground, such pipe being merely illustrative of a gas or water pipe or other embedded article or device in which in so many cases damaging electrolytic effects take place, and this pipe 14 is shown connected with the rails 7—7 of the elevated system. Thus the rails 2 of the surface system are charged with positive current and the pipe 14 is also charged, by reason of leakage from the rails 2, with positive current of lower voltage than in the rails, but in certain points also of higher voltage, depending upon the location with reference to the power station. The stray current which is carried in underground structures is mainly derived from surface systems, because the rails thereof lie relatively near to pipes and other underground structures throughout the area of a city, while the elevated and subway systems are ordinarily better insulated from the ground, are less numerous than the surface systems, and are relatively far removed from the pipes and underground structures, and consequently there is less tendency for the current to leak or stray from the elevated or subway systems to underground structures. By having the positive terminal of the generator of the surface system connected to the trolley wire 3, and the negative terminal of the generator grounded and also connected to the running rails 2 of the system, which is the common or ordinary arrangement and from which stray currents pass to the pipes or other underground structures, and by having the generator of the elevated system or the subway system, as the case may be, connected to the system reversely with respect to the connection of the surface system and its generator, the running rails 7 of the elevated or subway system are of negative potential with reference to the ground, and therefore of lower potential than the running rails 2 of the surface system, which are positive with relation to the ground, and consequently the stray current in the structure 14 will flow to the rails 7 of the elevated or subway system, and there can never be a reverse flow from the elevated system or subway system to the underground structure. By this arrangement electrolysis and damaging electrolytic effects will be prevented or greatly reduced. The negative potential of the elevated rails "boosts" the positive current out of the pipes.

It will be understood, of course, that connection between the elevated system and the pipes to be protected is made in many and various places, so that a network of pipes is really connected with a network of elevated tracks. It will be seen that this result is accomplished by simple means involving very little expense and so no large outlay of money is required to bring about this highly desirable result of freeing the locality of the electrical systems from electrolysis and electrolytic effects.

It will be seen that there is no interference between the two systems and no need of compensating or balancing either one by the other. Not only are the two systems completely separate in their distribution so that no difficulty in operation follows, but at the same time there are no maintenance expenses and there is certainty that stray currents if any in the ground will flow only into the pipes and not out of the same except over connections provided for them, thus insuring against electrolytic effects because it is well known and admitted that such effects come only where electric currents leave pipes in the ground, especially at places where the ground is moist. Furthermore, the system always maintains its efficiency, because traffic on the two systems will increase and decrease in about the same proportion, being greatest at the rush hours in both systems and otherwise varying about the same.

It will be noticed that the invention is described by way of example in connection with two different kinds of traction systems, that is surface lines and elevated systems. The invention is capable of use with other systems, however, for example with surface lines and underground or with surface lines, underground and elevated. In case of surface lines and underground, the underground would be arranged as the elevated system here shown. In case of surface lines and elevated and underground, the three systems, two of the systems would be connected as the trolley system is herein shown, and the other or third would be connected as the elevated herein shown. In case of a single system, as for example trolley lines, a part of the system, as for example a belt or crosstown line would be connected as the elevated system is here shown, the balance being connected as the trolley line is shown herein.

The connection between the grounds of the two power houses can be effected at very low expense by means of the existing network of rails; but in case special connections may seem necessary they can be provided at little expense, because the amount of current to be carried is always quite small. The essential thing is to have the generators of the several systems in circuit, which can be accomplished by grounding the negative terminal of one and the positive terminal of the other where the power houses are sufficiently close together, but where the power houses are relatively remote, the terminals should be electrically connected by a metallic conductor.

In the claims, I have made use of the expression "independent and physically distinct electric traction systems", and this expression is intended to mean surface and elevated systems, surface and subway systems, or a combination of these three different systems.

It will be understood that changes and modifications can be made without departing from the spirit of the invention.

What I claim is:

1. In a system of electrical distribution, the combination of independent and physically distinct D. C. electric traction systems, and an electrically conductive underground structure in electric proximity to one of the traction systems, each traction system having its own generator, running rails and supply conductor, the running rails of one traction system constituting the positive side of said system, and reversely running rails of the other system constituting the negative side of its system, the generators of the reversed systems being in circuit, and a plurality of low resistance bonds extending between the underground structure and the running rails of the first-mentioned system, whereby electrolytic damage to the underground structure is reduced.

2. In a system of electrical distribution, the combination of independent and physically distinct D. C. electric traction systems, and an electrically conductive underground structure in electric proximity to one of the traction systems, each traction system having its own generator, running rails and supply conductor, the running rails of one traction system constituting the positive side of said system, and reversely running rails of the other traction system constituting the negative side of its system, a plurality of low resistance bonds extending between the underground structure and the running rails of the first-mentioned system, and an electric connection between the terminals of the reversed generators of the traction systems, whereby electrolytic damage to the underground structure is reduced.

3. In a system of electrical distribution, the combination of independent and physically distinct D. C. electric traction systems, one of said systems being substantially insulated from the ground, the other system not being insulated from the ground, an electrically conductive underground structure in electric proximity to the system which is not insulated from the ground, each system having its own generator, running rails and supply conductor, the running rails of the substantially insulated system constituting the positive side of said system, and reversely the running rails of the said other system constituting the negative side of its system, the generators of the reversed systems being in circuit, and a plurality of low resistance bonds extending between the underground structure and the running rails of the substantially insulated system, whereby electrolytic damage to the underground structure is reduced.

4. In a system of electrical distribution, the combination of independent and physically distinct D. C. electric traction systems, one of said systems being substantially insulated from the ground, the other system not being insulated from the ground, an electrically conductive underground structure in electric proximity to the system which is not insulated from the ground, each system having its own generator, running rails and supply conductor, the running rails of the substantially insulated system constituting the positive side of said system, and reversely the running rails of the said other system constituting the negative side of its system, a plurality of low resistance bonds extending between the underground structure and the running rails of the substantially insulated system, and a connection between the terminals of the reversed generators of the traction systems, whereby electrolytic damage to the underground structure is reduced.

In witness whereof, I hereunto subscribe my name this 26th day of August, A. D., 1912.

FERRUCCIO CASTIGLIONI.

Witnesses:
  A. MILLER BELFIELD,
  A. L. JONES.

Copies of this patent may be obtained for five cents each, by addressing the "Commissioner of Patents, Washington, D. C."